United States Patent
Terada et al.

(10) Patent No.: US 7,611,196 B2
(45) Date of Patent: Nov. 3, 2009

(54) HEADREST

(75) Inventors: Takami Terada, Toyota (JP); Takemi Hattori, Anjo (JP); Kiyoka Matsubayashi, Aichi-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 216 days.

(21) Appl. No.: 11/385,685

(22) Filed: Mar. 22, 2006

(65) Prior Publication Data

US 2006/0226688 A1 Oct. 12, 2006

(30) Foreign Application Priority Data

Mar. 23, 2005 (JP) ............................. 2005-083159

(51) Int. Cl.
*B60N 2/427* (2006.01)
(52) U.S. Cl. ................................. 297/216.12
(58) Field of Classification Search ............ 297/216.12, 297/408, 391
See application file for complete search history.

(56) References Cited

U.S. PATENT DOCUMENTS

| | | | | |
|---|---|---|---|---|
| 4,762,367 A | * | 8/1988 | Denton | 297/409 |
| 5,020,855 A | * | 6/1991 | Lindberg et al. | 297/391 |
| 5,694,320 A | * | 12/1997 | Breed | 701/45 |
| 5,822,707 A | * | 10/1998 | Breed et al. | 701/49 |
| 5,927,804 A | * | 7/1999 | Cuevas | 297/216.12 |
| 6,082,817 A | * | 7/2000 | Muller | 297/216.12 |

(Continued)

FOREIGN PATENT DOCUMENTS

DE 199 23 659 A1 11/2000

(Continued)

OTHER PUBLICATIONS

European Search Report dated Jul. 12, 2006.

(Continued)

*Primary Examiner*—David Dunn
*Assistant Examiner*—James Alex
(74) *Attorney, Agent, or Firm*—Buchanan Ingersoll & Rooney PC

(57) ABSTRACT

In a headrest, a first connecting portion, including a first link and a second link relatively rotatably supported to the first link, is provided between a base portion and a receive portion movable between a first and second positions adjacent to/separate from the base portion. A drive portion drives the first connecting portion through a drive input portion provided at least either one of the first and second links by applying a driving force to the drive input portion in a moving direction of the receive portion toward the second position. First and second end portions of the first link are supported by the base portion and the receive portion through first and second pivot points. First and second end portions of the second link are slidably connected to first and second guide portions respectively provided at the base portion and the receive portion through first and second connecting points.

15 Claims, 4 Drawing Sheets

U.S. PATENT DOCUMENTS

| | | | |
|---|---|---|---|
| 6,196,579 B1 * | 3/2001 | Bowers et al. | 280/735 |
| 6,213,548 B1 * | 4/2001 | Van Wynsberghe et al. | 297/216.12 |
| 6,402,195 B1 * | 6/2002 | Eisenmann et al. | 280/735 |
| 6,623,073 B2 * | 9/2003 | Schafer et al. | 297/216.12 |
| 6,746,078 B2 * | 6/2004 | Breed | 297/216.12 |
| 7,070,235 B2 * | 7/2006 | Schilling et al. | 297/216.12 |
| 7,073,856 B2 * | 7/2006 | Akaike et al. | 297/216.12 |
| 7,145,263 B2 * | 12/2006 | Nathan et al. | 307/10.1 |
| 7,284,793 B2 * | 10/2007 | Kluhspies et al. | 297/216.12 |
| 2005/0280304 A1 * | 12/2005 | Akaike et al. | 297/391 |
| 2006/0071518 A1 * | 4/2006 | Hippel et al. | 297/216.12 |
| 2006/0279114 A1 * | 12/2006 | Toda et al. | 297/216.12 |
| 2007/0246989 A1 * | 10/2007 | Brockman | 297/391 |
| 2007/0257528 A1 * | 11/2007 | Akaike et al. | 297/216.12 |

FOREIGN PATENT DOCUMENTS

| | | |
|---|---|---|
| EP | 1 431 109 A1 | 6/2004 |
| EP | 1 491 394 A1 | 12/2004 |
| EP | 1 712 406 A1 | 10/2006 |
| JP | 8-187139 A | 7/1996 |
| JP | 11-334439 A | 12/1999 |
| JP | 2003-070591 A | 3/2003 |
| WO | WO 2005/073019 A1 | 8/2005 |

OTHER PUBLICATIONS

European Office Action dated Oct. 17, 2007.

* cited by examiner

HEADREST

CROSS REFERENCE TO RELATED APPLICATIONS

This application is based on and claims priority under 35 U.S.C. § 119 to Japanese Patent Application 2005-083159, filed on Mar. 23, 2005, the entire content of which is incorporated herein by reference.

FIELD OF THE INVENTION

This invention generally relates to a headrest. More particularly, this invention pertains to a headrest of a seat for a vehicle.

BACKGROUND

When a rear end of a vehicle collides with another vehicle running from backward (rear end collision), a body of an occupant is strongly pushed to a seatback. At the same time, a head (neck) of the occupant is bent backward largely and carried upward. After that, the body and the head of the occupant are forced to fall forward by counter force suddenly. Thus, at the time of the rear end collision, when sudden force is applied, in particular, to the head, even when the force is not so strong, there can be a possibility for the occupant to be whiplashed. Accordingly, in particular, a function for inhibiting a backward bend of a head of an occupant that is caused by the rear end collision is desired for a headrest.

For inhibiting whiplash of an occupant by a rear end collision, it is desirable that a headrest moves immediately and appropriately to receive an entire region from a head to a neck of the occupant with reliability when the rear end collision occurs, or when the rear end collision is predicted.

JPH11-334439A (document 1) describes a conventional headrest provided at a seat for a vehicle. In this headrest, when the vehicle predicts or detects a rear end collision, a receive portion for receiving a head of an occupant sitting on the seat is moved diagonally upward to protect the head of the occupant. Such headrest is so called an active headrest. According to the document 1, the headrest includes a drive motor therein. The vehicle includes a sensor for predicting or detecting a rear end collision. Here, when a central processing unit (CPU) serving as a control means receives a signal notifying that the sensor predicts or detects a rear end collision, the CPU actuates the drive motor in the headrest. By the action of the drive motor, the headrest tilts diagonally upward. The tilted posture of the headrest protects the head of the occupant and inhibits whiplash of the occupant.

JP2003-70591A (document 2) describes another conventional headrest including an expansion portion for protecting a head of an occupant. In the headrest according to document 2, when the vehicle predicts or detects a rear end collision, air is supplied to the expansion portion by an air compressor to expand the expansion portion thereby to protect the head of the occupant and inhibit whiplash of the occupant.

JPH8-187139A (document 3) describes still another conventional headrest including a contact pressure sensor for detecting a contact pressure applied from a head of an occupant. In the headrest according to document 3, the headrest is driven and controlled so that a constant contact pressure can be applied to the headrest from the head of the occupant. When a rear end collision is predicted on the basis of change of the contact pressure from the head of the occupant, the headrest becomes a state in which the headrest is fixed. By doing so, the headrest can receive the head bent by the rear end collision, and can inhibit whiplash of the occupant.

In the headrest according to document 1, when the vehicle predicts or detects a rear end collision of the vehicle, the headrest tilts so that a lower portion of the headrest protrudes to an occupant side. Such tilt motion of the headrest might be effective only in a limited condition, for example, in a rear end collision at low speed. However, in a case where shock of a rear end collision is particularly large, the head of the occupant is bent backward largely. If the headrest tilts in such a case, a neck of the occupant is pressed by the protruding lower portion of the headrest. Accordingly, such tilt motion would be dangerous rather than effective. Therefore, such headrest of a tilt type would cause high risk of whiplash of an occupant.

In the headrest according to document 2, the air compressor blows air into the expansion portion. Accordingly, a certain length of time is necessary for sufficiently filling the expansion portion with air after the vehicle predicts or detects a rear end collision. Therefore, it is difficult to inhibit whiplash of the occupant with reliability by such a type of headrest with an expansion portion at the time of an instantaneous occurrence of a rear end collision of the vehicle.

In the headrest according to document 3, when the collision sensor equipped with a vehicle detects a rear end collision of the vehicle, the headrest is fixed to a supporting posture. In other words, the headrest does not receive the head of the occupant actively. Accordingly, the headrest cannot contact with a back of the head with reliability when the head of the occupant is bent backward by shock of the rear end collision. Further, because the headrest includes the contact pressure sensor, or the like, for detecting the contact pressure from the head, a configuration of the headrest tends to be complex and large in size. As a result, manufacturing cost tends to be high.

A need thus exists for a headrest which can move quickly and protect a head of an occupant with reliability when a vehicle predicts or detects a rear end collision of the vehicle. The present invention has been made in view of the above circumstances and provides such a headrest.

SUMMARY OF THE INVENTION

According to an aspect of the present invention, a headrest includes a base portion attached to an upper part of a seat, a receive portion for receiving a head of an occupant sitting on the seat and movable between a first position adjacent to the base portion and a second position separate from the base portion, a first connecting portion provided between the base portion and the receive portion for connecting the base portion with the receive portion and including a first link and a second link relatively rotatably supported to the first link, a drive input portion provided at least at either one of the first link and the second link, and a driving portion for driving the first connecting portion through the drive input portion. A first end portion of the first link is supported by the base portion through a first pivot point. A second end portion of the first link is supported by the receive portion through a second pivot point. A first end portion of the second link is slidably connected to a first guide portion provided at the base portion through a first connecting point. A second end portion of the second link is slidably connected to a second guide portion provided at the receive portion through a second connecting point. A driving force is applied to the drive input portion by the driving portion in a moving direction of the receive portion toward the second position.

According to a further aspect of the present invention, a headrest includes a base portion attached to an upper part of a seat, a receive portion for receiving a head of an occupant sitting on the seat and movable between a first position adjacent to the base portion and a second position separate from the base portion, a first connecting portion provided between the base portion and the receive portion for connecting the base portion with the receive portion and including a first link and a second link relatively rotatably supported to the first link by a support shaft, and a drive input portion provided at the support shaft. A driving force is applied to the drive input portion from a driving apparatus.

According to a further aspect of the present invention, a headrest includes a base portion attached to an upper part of a seat, a receive portion for receiving a head of an occupant sitting on the seat and movable between a first position adjacent to the base portion and a second position separate from the base portion, a first connecting portion provided between the base portion and the receive portion for connecting the base portion with the receive portion, and a drive input portion provided at the first connecting portion. A driving force is applied to the drive input portion from a driving apparatus. The driving force is applied to the drive input portion by the driving apparatus in a moving direction of the receive portion toward the second position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1A:
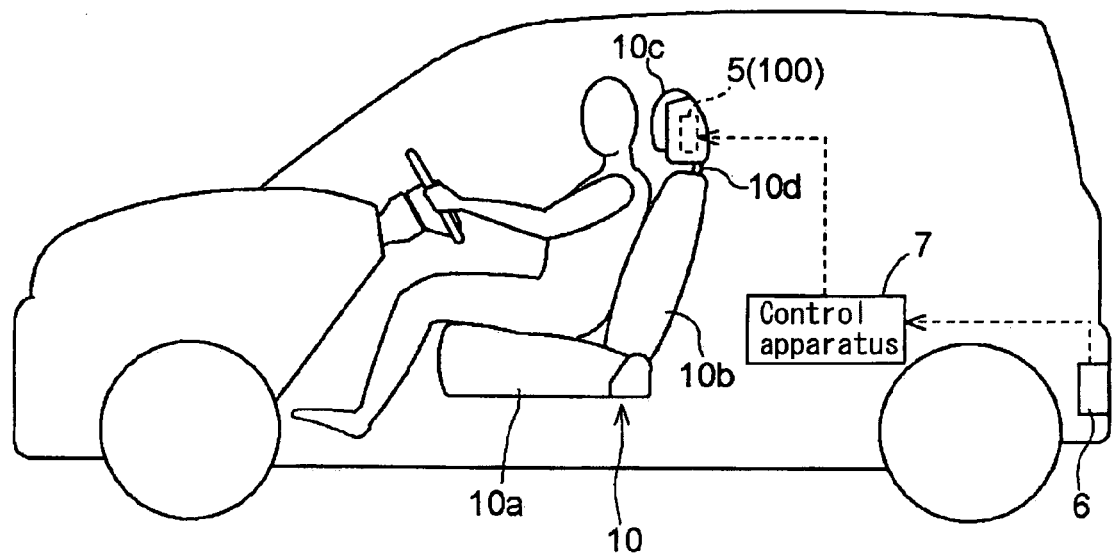
FIGS. 1A and 1B represent diagrams illustrating a headrest according to an embodiment of the present invention in a state where the headrest is attached to a seat of a vehicle.
Figure 1B:
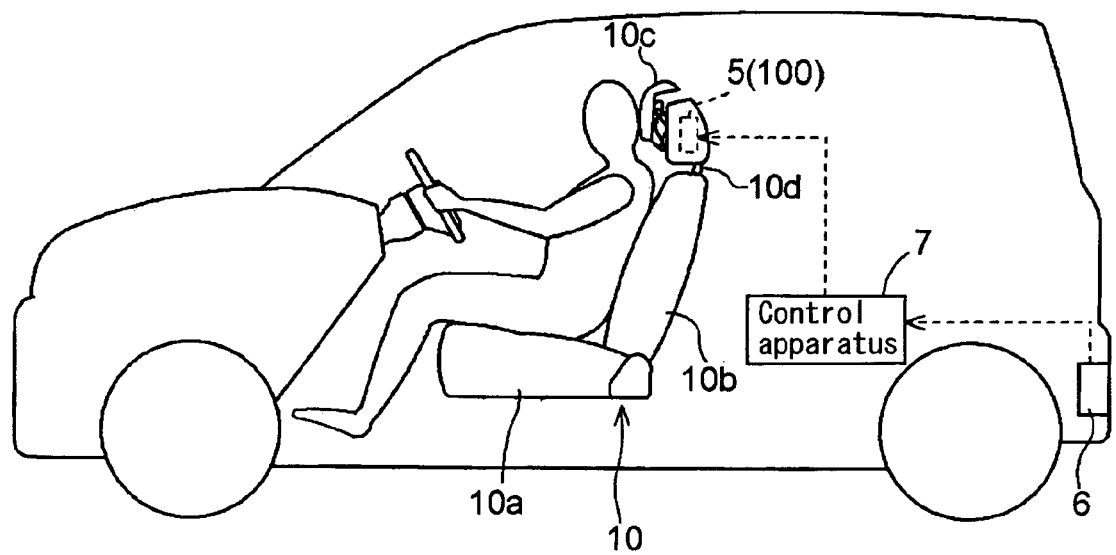

An embodiment of the present invention will be explained with reference to drawing figures. FIGS. 1A and 1B represent diagrams illustrating a headrest 100 attached to a seat 10 of a vehicle according to the embodiment of the present invention. The seat 10 includes a seat cushion 10a, a seatback 10b, and a headrest cushion 10c. FIG. 1A represents a diagram illustrating a headrest apparatus 100 before the headrest apparatus 100 is operated (there is a clearance between a head of an occupant and the headrest cushion 10c). FIG. 1B represents a diagram illustrating the headrest apparatus 100 after the headrest apparatus 100 is operated (there is no clearance between a head of an occupant and the headrest cushion 10c).

Figure 2:
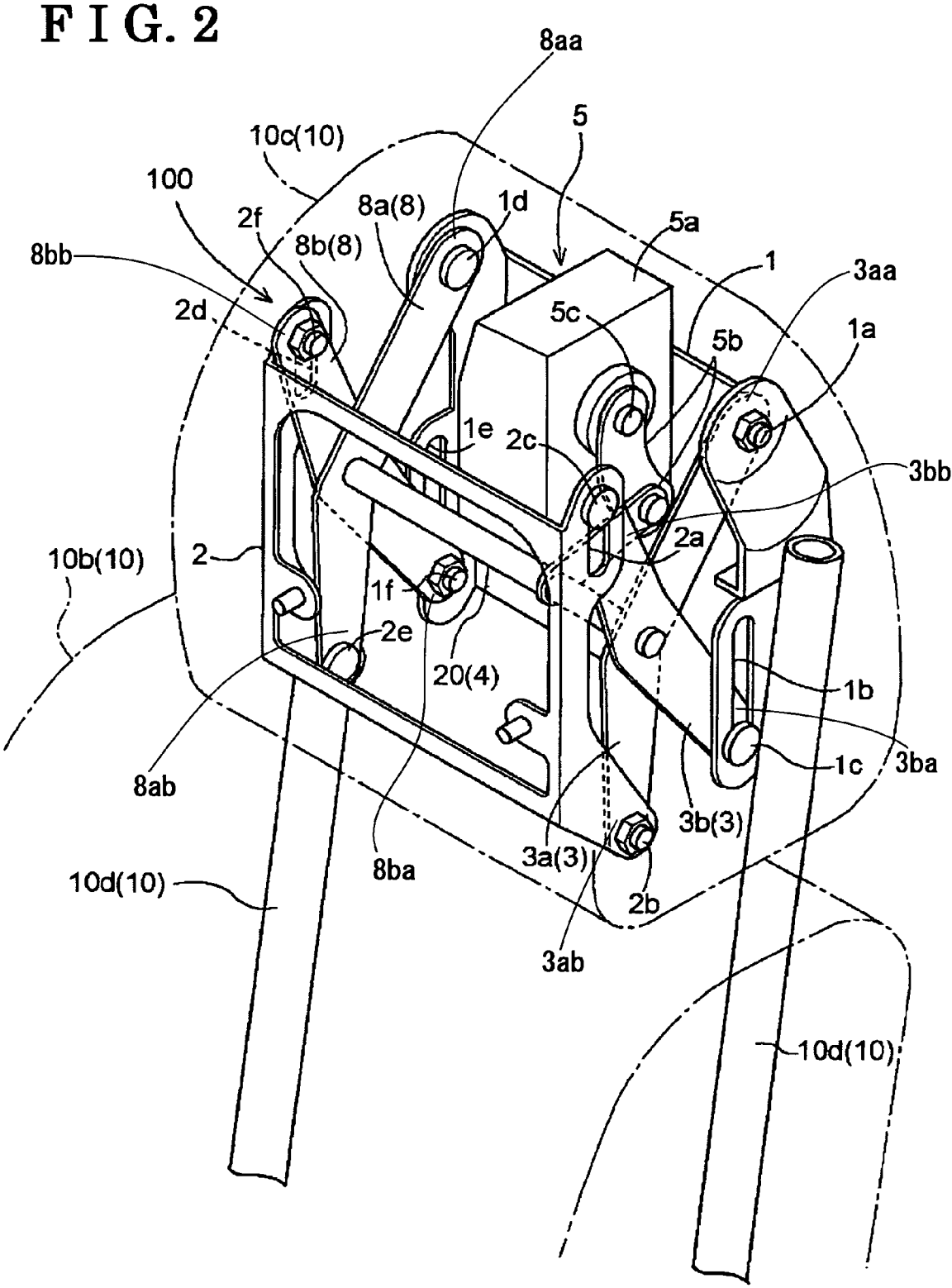
FIG. 2 represents a perspective view illustrating the headrest according to the embodiment of the present invention.

FIG. 2 represents a perspective view illustrating the headrest 100 according to the embodiment of the present invention. The headrest 100 includes a base portion 1, a receive portion 2, a first connecting portion 3, a drive input portion 4, and a driving portion 5 as a driving apparatus. As illustrated in FIGS. 1A and 1B, actions of the headrest 100 are controlled by a control portion 7 when the control portion 7 receives a signal from a rear end collision sensor 6. Components included in the headrest 100 will be explained below.

The base portion 1 is attached to an upper part of the seat 10. It is desirable that the base portion 1 is attached firmly to a stay 10d so that the attachment between the base portion 1 and the stay 10d can endure shock of collision. For example, a lower end portion of the base portion 1 can be attached to an upper end portion of the stay 10d of the seat 10 by welding. Alternatively, the lower end portion of the base portion 1 can be attached to the upper end portion of the stay 10d of the seat 10 by a screw.

The receive portion 2 receives a head of an occupant sitting on the seat 10. The receive portion 2 can move forward from the base portion 1 and move backward to the base portion 1. The receive portion 2 can move between a first position at which the receive portion 2 is adjacent to the base portion 1 and a second position at which the receive portion 2 is separate from the base portion 1. The receive portion 2 can be actuated by driving the first connecting portion 3 (and/or second connecting portion 8), which will be described below. The first position means a backmost position where the receive portion 2 can move. In the headrest illustrated in FIG. 2, the receive portion 2 is located at the first position. The second position means a foremost position where the receive portion 2 can move. In other words, the first position is closer to the base portion 1 than the second position is.

The first connecting portion 3 includes a first link 3a, a second link 3b, and a support shaft 20. The first link 3a crosses the second link 3b. The first link 3a and the second link 3b are supported relatively rotatably to each other. Here, an example will be explained in which an X-shape link is configured from the first link 3a and the second link 3b. The first link 3a and the second link 3b are supported by the common support shaft 20 at a crossing point of the first link 3a with the second link 3b (first crossing portion). In the meantime, at least either one of the first link 3a and the second link 3b can have the support shaft 20. Alternatively, instead of the support shaft 20, the first link 3a and the second link 3b can be supported by fastening the crossing point thereof with a pin (not illustrated).

A first end portion 3aa of the first link 3a is supported by the base portion 1 through a first pivot point 1a provided near the upper end portion of the base portion 1. A second end portion 3ab of the first link 3a is supported by the receive portion 2 through a second pivot point 2b provided near a lower end portion of the receive portion 2. A first end portion 3ba of the second link 3b is slidably connected to a first guide portion 1b provided near the lower end portion of the base portion 1 through a first connecting point 1c. A second end portion 3bb of the second link 3b is slidably connected to a second guide portion 2a provided near the upper end portion of the receive portion 2 through a second connecting point 2c. The first connecting portion 3 is provided between the base portion 1 and the receive portion 2 to connect the base portion 1 with the receive portion 2.

The first connecting portion 3 can be provided at a first side of the headrest 100 only. As illustrated in FIG. 2, a second connecting portion 8 can be provided at a second side of the base portion 1 and the receive portion 2.

The second connecting portion 8 includes a third link 8a and a fourth link 8b. The third link 8a crosses the fourth link 8b. The third link 8a and the fourth link 8b are supported by a shaft at the crossing point thereof (second crossing portion). The third link 8a and the fourth link 8b are supported relatively rotatably to each other. Here also, an example will be explained in which an X-shape link is configured from the third link 8a and the fourth link 8b. The third link 8a and the fourth link 8b are supported by the common support shaft 20. Alternatively, instead of the support shaft 20, the third link 8a and the fourth link 8b can be supported by fastening the crossing point thereof with a pin (not illustrated).

A first end portion 8aa of the third link 8a is supported by the base portion 1 through a third pivot point 1d provided near the upper end portion of the base portion 1. A second end portion 8ab of the third link 8a is supported by the receive portion 2 through a fourth pivot point 2e provided near a lower end portion of the receive portion 2. A first end portion 8ba of the fourth link 8b is slidably connected to a third guide portion 1e provided near the lower end portion of the base portion 1 through a third connecting point 1f. A second end portion 8bb of the fourth link 8b is slidably connected to a fourth guide portion 2d provided near the upper end portion of the receive portion 2 through a fourth connecting point 2f. The second connecting portion 8 is provided between the base portion 1 and the receive portion 2 to connect the base portion 1 with the receive portion 2.

In following, an explanation will be made taking an example in which the headrest 100 includes the first connecting portion 3 and the second connecting portion 8. When the first and second connecting portions 3 and 8 are provided at the first and second sides respectively, the receive portion 2 can more stably move forward/backward from/to the base portion 1. Further, when the first and second connecting portions 3 and 8 are provided at the first and second sides respectively, force received by the receive portion 2 can be transmitted to the base portion 1 in a balanced manner. Still further, when the first and second connecting portions 3 and 8 are provided at the first and second sides respectively, entire rigidity of the headrest 100 can be improved.

The drive input portion 4 receives driving force from the driving portion 5. In this embodiment, when the driving force is transmitted to the drive input portion 4, the first connecting portion 3 and the second connecting portion 8 are driven to enable the receive portion 2 to move forward/backward from/ to the base portion 1. For example, the support shaft 20, illustrated in FIG. 2, and explained above, can be the drive input portion 4. The support shaft 20 is a common part for supporting the first, second, third, and fourth links 3a, 3b, 8a, and 8b. Accordingly, when the driving force is transmitted to the support shaft 20, the driving force can be separately transmitted to the first, second, third, and fourth links 3a, 3b, 8a, and 8b. As a result, force can be applied to entire links in an approximately balanced manner. Accordingly, the receive portion 2 can be actuated smoothly. Further, when the first and second connecting portions 3 and 8 are connected by the common support shaft 20, rigidity of the headrest 100 can be further improved.

The support shaft 20 described above can be integrally formed with the first link 3a and the third link 8a. Alternatively, the support shaft 20 can be integrally formed with the second link 3b and the fourth link 8b. In this case, when the support shaft 20 receives biasing force from the driving portion 5, the first and second connecting portions 3 and 8 can be easily actuated in the same manner, the receive portion 2 can be actuated stably, and a right side receive portion 2 and a left side receive portion 2 can be actuated uniformly. Further, it becomes possible to appropriately receive and protect a head of an occupant. Further, because the first and third links 3a and 8a are integrally formed with the support shaft 20 provided therebetween, or, because the second and fourth links 3b and 8b are integrally formed with the support shaft 20 provided therebetween, rigidity of the headrest 100 can be further improved.

When the first and second links 3a and 3b are supported by fastening a crossing point thereof by a pin and the third and fourth links 8a and 8b are supported by fastening a crossing point thereof by a pin, instead of utilizing the support shaft 20, for example, an appropriate size protrusion, which is engageable with the driving portion 5, can be provided at the first link 3a, the second link 3b, the third link 8a, or the fourth link 8b by welding, or the like. The protrusion can be the drive input portion 4.

The driving portion 5 includes a main body 5a and a drive link 5b. In this embodiment, as illustrated in FIG. 2, the drive link 5b includes two link members. However, it is not limited. The number of links can be any of one, three, and more than three. A first end portion of the drive link 5b is connected to a drive output portion 5c of the main body 5a. A second end portion of the drive link 5b is connected to the support shaft 20. Here, the drive input portion 4 to which the driving force is transmitted from the driving portion 5 is the support shaft 20. As the driving portion 5, a commonly-utilized electric motor can be utilized. A rotational drive shaft of the electric motor can be the drive output portion 5c.

Rotational driving force from the electric motor is transmitted to the support shaft 20 through the drive link 5b as biasing force for pressing the support shaft 20 in a moving direction of the receive portion 2. This pressing direction approximately corresponds to the moving direction of the receive portion 2. Thus, a driving force direction corresponds to the moving direction. Accordingly, driving force generated by the driving portion 5 can be consumed for moving the receive portion 2 without large dispersion or loss. Therefore, the amount of friction loss and energy loss in a transmission path of the driving force from the driving portion 5 to the support portion 20 can be reduced. As a result, responsiveness of the headrest 100 can be improved, and eventually, stable control of the headrest 100 can be enabled.

As the electric motor utilized for the driving portion 5, an electromagnetic motor, a direct current motor, an alternative current motor, a pulse motor, a linear motor, or the like, can be employed. In addition, the driving portion 5 can be a power source utilizing hydraulic pressure or air pressure.

The rear end collision sensor 6 predicts or detects a rear end collision of the vehicle (collision with another vehicle running from backward). Then, the prediction or detection result is transmitted to the control portion 7, which will be described below. The rear end collision sensor 6 can be provided, for example, at an appropriate position in a rearward portion of the vehicle (for example, a bumper), as illustrated in FIGS. 1A and 1B. In this case, the rear end collision sensor 6 monitors another vehicle approaching the vehicle from the rearward direction, utilizing ultrasonic wave, electromagnetic wave, infrared wave, or the like. Further, a back camera provided at a rearward portion of the vehicle can be utilized as the rear end collision sensor 6. In this case, by analyzing a picture taken by the back camera, a rear end collision of the vehicle can be predicted or detected. Further, a sensor for sensing a wearing state of a seatbelt worn by the occupant sitting on the seat 10 can also be utilized as the rear end collision sensor 6. For example, the rear end collision sensor 6 can be linked to a switch of the sensor with a seatbelt pretensioner, which is operated when the vehicle receives shock. A load sensor for detecting a seating state of the occupant, a speed sensor for detecting a running state of the vehicle, or the like, can be exampled as other configurations of the rear end collision sensor 6.

The control portion 7 controls the driving portion 5 on the basis of the prediction result or the detection result of the rear end collision sensor 6. In other words, when the rear end collision sensor 6 predicts or detects a rear end collision of the vehicle, the control portion 7 receives a signal from the rear end collision sensor 6 and controls the driving portion 5 so that the receive portion 2 moves forward to the second position from the base portion 1. Here, a dedicated central processing unit (CPU) can be utilized as the control portion 7.

However, it is not limited. An existing in-vehicle computer (ECU) can have a function of the control portion 7. Further, when the dedicated CPU is utilized as the control portion 7, the CPU can also include a control circuit of the driving portion 5, or the like, and can be configured as a single chip, and can be installed to the driving portion 5.

Next, an action of the headrest cushion 10c in the headrest 100 attached to the seat 10, in other words, a moving action of the receive portion 2 from the base portion 1 between the first position and the second position will be explained with reference to FIGS. 3 and 4.

Figure 3:
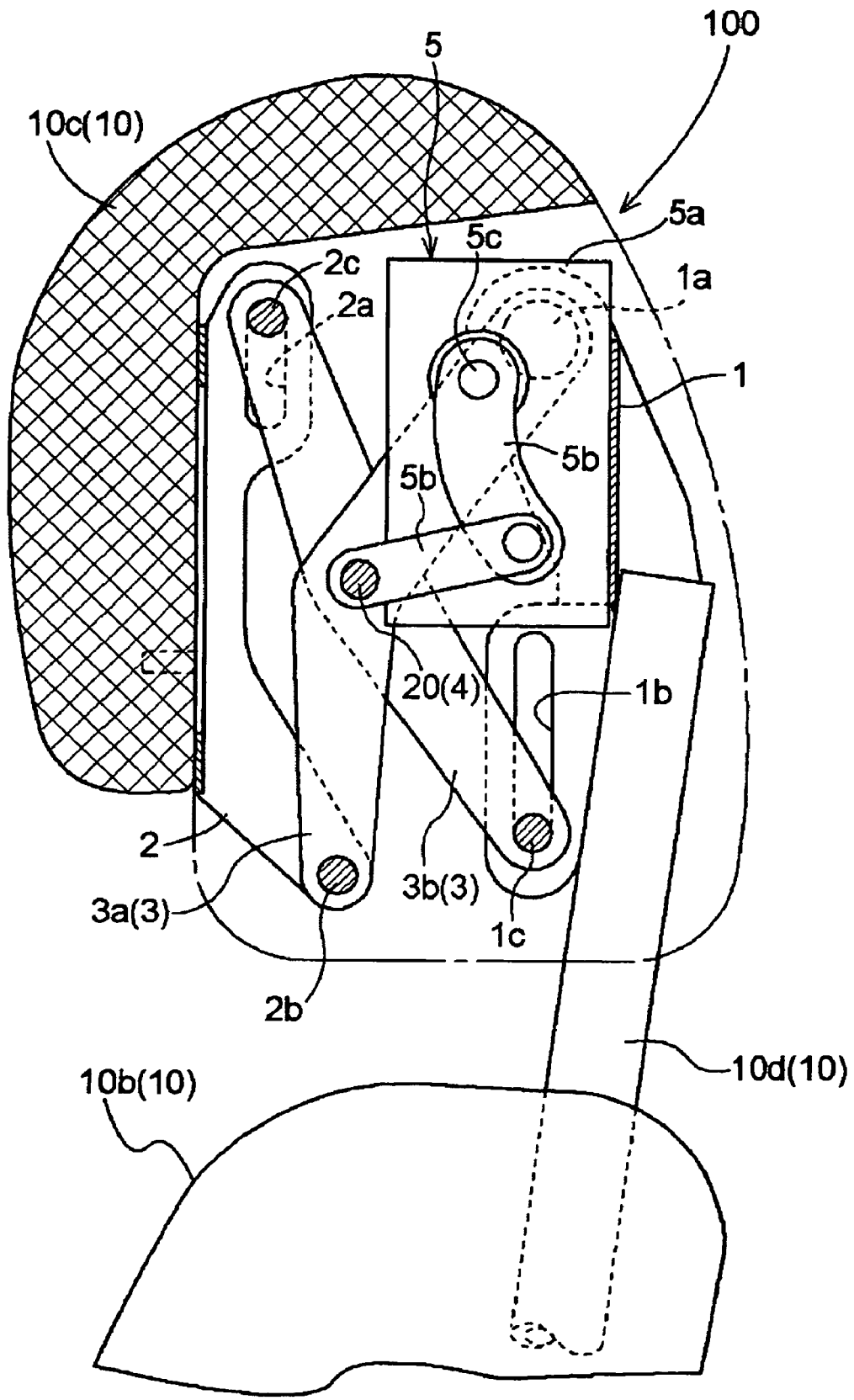
FIG. 3 represents a side view illustrating the headrest in a state where a receive portion is at a first position adjacent to a base portion.
Figure 4:
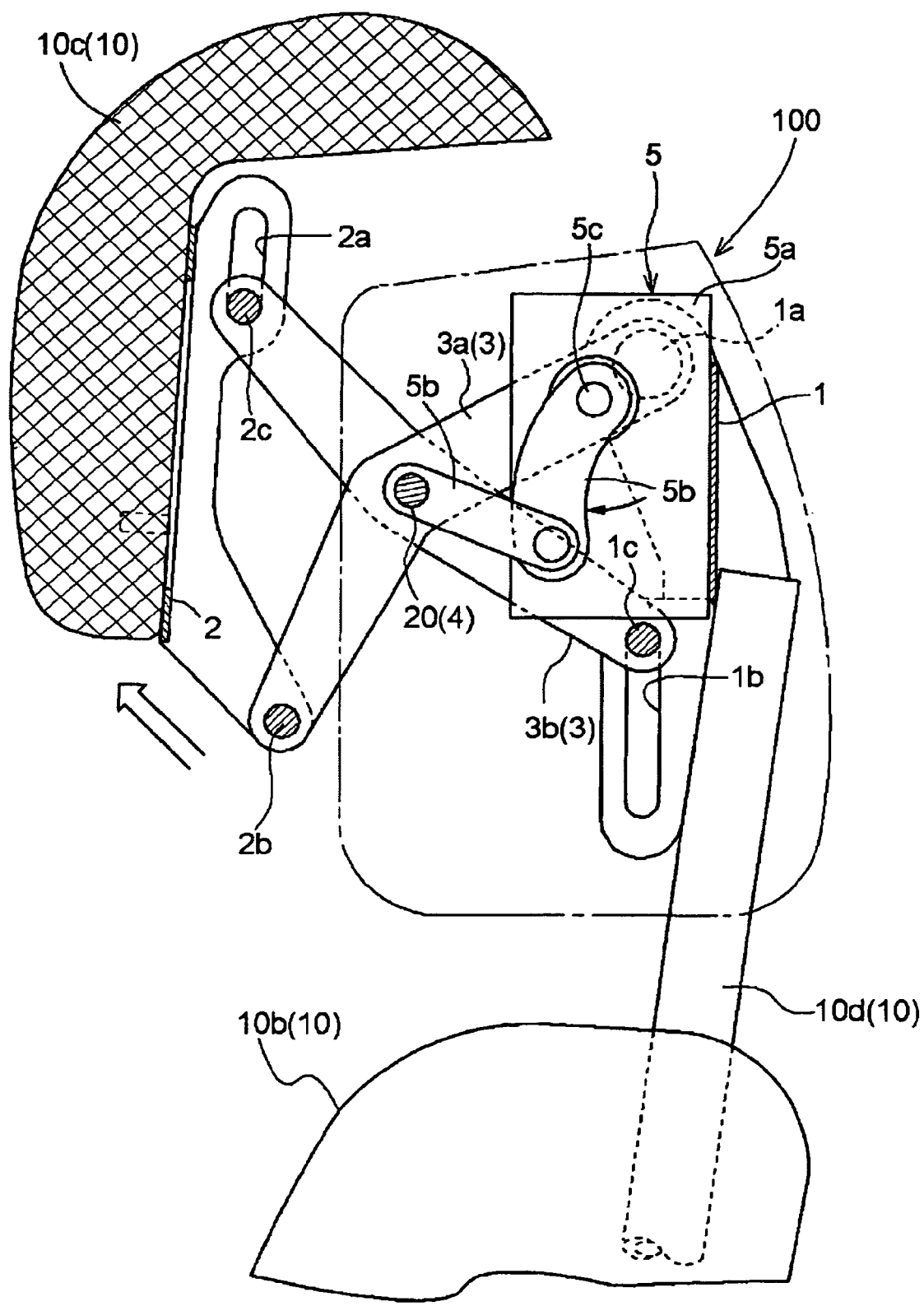
FIG. 4 represents a side view illustrating the headrest in a state where the receive portion is at a second position separate from the base portion.

FIG. 3 represents a side view illustrating the headrest 100 in a state where the receive portion 2 is positioned at the first position adjacent to the base portion 1. FIG. 4 represents a side view illustrating the headrest 100 in a state where the receive portion 2 is positioned at the second position separate from the base portion 1.

In the first position illustrated in FIG. 3, the first connecting point 1c of the second link 3b is positioned at a lower end side of the first guide portion 1b provided at the lower end portion of the base portion 1, and the second connecting point 2c of the second link 3b is positioned at an upper end side of the second guide portion 2a provided at the upper end portion of the receive portion 2. At this time, the third connecting point 1f of the fourth link 8b is positioned at a lower end side of the third guide portion 1e provided at the lower end portion of the base portion 1, and the fourth connecting point 2f of the fourth link 8b is positioned at an upper end side of the fourth guide portion 2d provided at the upper end portion of the receive portion 2. Accordingly, the receive portion 2 does not move toward the base portion 1 any more.

When the rear end collision sensor 6 predicts or detects a rear end collision of the vehicle, the control portion 7 transmits a command to the driving portion 5 to rotate the drive output portion 5c in the main body 5a of the driving portion 5 in a clockwise direction as seen in the figure. Rotational driving force from the drive output portion 5c becomes, through the drive link 5b, biasing force for biasing the support shaft 20 in a left direction as seen in the figure (a direction in which the receive portion 2 moves to the second position). When the support shaft 20 starts to move in a left direction by the biasing force, the first link 3a rotates around the first pivot point 1a provided at the upper end portion of the base portion 1 clockwise as seen in the figure. Further, the first connecting point 1c of the second link 3b slides upward in the first guide portion 1b, and the second connecting point 2c of the second link 3b slides downward in the second guide portion 2a. Similarly, at this time, the third link 8a rotates around the third pivot point 1d provided at the upper end portion of the base portion 1. Further, the third connecting point 1f of the fourth link 8b slides upward in the third guide portion 1e, and the fourth connecting point 2f of the fourth link 8b slides downward in the fourth guide portion 2d. Here, the first pivot point 1a is placed higher than the first connecting point 1c, and the second pivot point 2b is placed lower than the second connecting point 2c. Similarly, the third pivot point 1d is placed higher than the third connecting point 1f, and the fourth pivot point 2e is placed lower than the fourth connecting point 2f. Further, when the receive portion 2 is placed at the first position, the second pivot point 2b is placed lower than the first pivot point 1a. Similarly, at this time, the fourth pivot point 2e is placed lower than the third pivot point 1d. As a result, the receive portion 2 moves diagonally upward from the base portion 1, and becomes to the second position illustrated in FIG. 4. In this embodiment, a level of a lower end of the second guide portion 2a is set higher than that of an upper end of the first guide portion 1b. Similarly, a level of a lower end of the fourth guide portion 2d is set higher than that of an upper end of the third guide portion 1e. Accordingly, the receive portion 2 always positions upper than the base portion 1.

Thus, in the headrest 100 according to the embodiment of the present invention, when a rear end collision trouble of the vehicle occurs, the receive portion 2 can appropriately contact with a back of the head of the occupant so as to receive an entire head of the occupant. In other words, when a rear end collision occurs, though the head of the occupant tends to lean backward and move upward, the receive portion 2 moves diagonally upward. Accordingly, such behavior of the head of the occupant can be inhibited, and whiplash of the occupant can be inhibited with reliability.

Further, in the headrest 100 according to the embodiment of the present invention, at an initial stage at which the first connecting portion 3 is actuated (and the second connecting portion 8 is actuated in a similar manner), the first link 3a and the second link 3b rotates, like an X link, around the support shaft 20, which is a common support shaft of the first link 3a and the second link 3b. Similarly, the third link 8a and the fourth link 8b rotate. In this case, an initial extension length becomes large in a moving direction of the receive portion 2 in particular. This means that initial acceleration of the receive portion 2 can become large.

Thus, in the headrest 100 according to the embodiment of the present invention, the receive portion 2 can contact with a back of a head of an occupant immediately after a rear end collision is predicted. In other words, quick and good responsiveness against a rear end collision trouble can be realized. Accordingly, the head of the occupant can be protected quickly with reliability. Thus, higher level of safety can be obtained.

In the meantime, the headrest 100 according to the embodiment of the present invention can also have a function for adjusting an initial position of the headrest cushion 10c, which is performed when an occupant sits on the seat 10. By this initial position adjustment function, a position of the receive portion 2 can be adjusted so that a distance between the head of the sitting occupant and the headrest cushion 10c can be appropriately retained. Precisely, for example, when a load sensor provided at the seat 10 for detecting a seat load detects that the occupant sits down on the seat 10, the driving portion 5 can be driven so as to move the receive portion 2 forward. Then, when the headrest cushion 10c contacts with a back of a head of the occupant, the moving action of the receive portion 2 can be stopped. After that, the receive portion 2 can be slightly moved backward to make an appropriate space between the back of the head of the occupant and the headrest cushion 10c. Accordingly, the occupant can obtain and retain a comfortable seat state.

The headrest 100 according to the embodiment of the present invention can also be utilized for applications other than a seat of a vehicle. For example, when the headrest 100 is installed to a seat of an airplane, a ship, a train, or the like, a level of safety for a passenger can be further improved. Further, the headrest 100 can be installed to a ride-on in an amusement place to effectively ensure safety of a child in particular.

According to an aspect of the present invention, a headrest includes a base portion attached to an upper part of a seat, a receive portion for receiving a head of an occupant sitting on the seat and movable between a first position adjacent to the base portion and a second position separate from the base portion, a first connecting portion provided between the base portion and the receive portion for connecting the base portion with the receive portion and including a first link and a second link relatively rotatably supported to the first link, a drive input portion provided at least at either one of the first link and the second link, and a driving portion for driving the first connecting portion through the drive input portion. A first end portion of the first link is supported by the base portion through a first pivot point. A second end portion of the first link is supported by the receive portion through a second pivot point. A first end portion of the second link is slidably connected to a first guide portion provided at the base portion through a first connecting point. A second end portion of the second link is slidably connected to a second guide portion provided at the receive portion through a second connecting point. A driving force is applied to the drive input portion by the driving portion in a moving direction of the receive portion toward the second position.

According to the aspect of the present invention, the driving portion inputs the driving force to the drive input portion provided at least either one of the first link and the second link in the moving direction of the receive portion. By the driving force, in the first connecting portion provided between the base portion and the receive portion, the receive portion is moved to the second position separate from the base portion from the first position adjacent to the base portion. At this time, a direction of the driving force applied to the first connecting portion approximately corresponds to the moving direction of the receive portion. Accordingly, the driving force can be utilized for moving the receive portion without large dispersion. As a result, the receive portion can be moved immediately. Thus, in the headrest according to the aspect of the present invention, the receive portion can contact with a back of a head of an occupant immediately after a rear end collision is predicted. Accordingly, the head of the occupant can be protected quickly with reliability. Thus, safety of the headrest can be improved.

According to a further aspect of the present invention, the headrest can further include a second connecting portion provided between the base portion and the receive portion for connecting the base portion with the receive portion and including a third link and a fourth link relatively rotatably supported to the third link. A first end portion of the third link is supported by the base portion through a third pivot point. A second end portion of the third link is supported by the receive portion through a fourth pivot point. A first end portion of the fourth link is slidably connected to a third guide portion provided at the base portion through a third connecting point. A second end portion of the fourth link is slidably connected to a fourth guide portion provided at the receive portion through a fourth connecting point.

According to the aspect of the present invention, because two connecting portions are provided between the base portion and the receive portion for connecting the base portion with the receive portion, a movement of the receive portion can be more stable. Further, force received by the receive portion can be transmitted to the base portion in a balanced manner. Still further, rigidity of entire headrest can be improved.

According to a further aspect of the present invention, at least either one of the first link and the second link can have a support shaft. The first link of the first connecting portion, the second link of the first connecting portion, the third link of the second connecting portion, and the fourth link of the second connecting portion can be supported by the common support shaft at a first crossing portion of the first link of the first connecting portion with the second link of the first connecting portion and at a second crossing portion of the third link of the second connecting portion with the fourth link of the second connecting portion. The drive input portion can be provided at the support shaft.

According to the aspect of the present invention, the driving force from the driving portion is input to the support shaft for connecting the first crossing portion of the first link with the second link with the second crossing portion of the third link with the fourth link in the moving direction of the receive portion to extend the first link, the second link, the third link, and the fourth link thereby to move the receive portion. Here, because the support shaft is commonly utilized for supporting the first link, the second link, the third link, and the fourth link, the driving force can be separately transmitted (dispersed) to the first link, the second link, the third link, and the fourth link. As a result, force can be approximately balanced in entire links. Accordingly, the receive portion can be moved smoothly. Further, because the first connecting portion is connected with the second connecting portion through the common support shaft, rigidity of the headrest can be further improved.

According to a further aspect of the present invention, the first link, the third link, and the support shaft can be integrally formed. According to a further aspect of the present invention, alternatively, the second link, the fourth link, and the support shaft can be integrally formed.

According to the aspects of the present invention, because the first link, the third link, and the support shaft are integrally formed, or, because the second link, the fourth link, and the support shaft are integrally formed, a movement of the first connecting portion can easily corresponds to a movement of the second connecting portion. Accordingly, the receive portion can be moved stably and in a balanced manner. By doing so, a head of an occupant can be appropriately received and protected. Further, because the first link, the third link, and the support shaft are integrally formed, or, because the second link, the fourth link, and the support shaft are integrally formed, rigidity of the headrest can be further improved.

According to a further aspect of the present invention, the first pivot point can be placed higher than the first connecting point. The second pivot point can be placed lower than the second connecting point. When the receive portion is at the first position, the second pivot point can be placed lower than the first pivot point. According to a further aspect of the present invention, the third pivot point can be placed higher than the third connecting point. The fourth pivot point can be placed lower than the fourth connecting point. When the receive portion is at the first position, the fourth pivot point can be placed lower than the third pivot point.

According to the aspects of the present invention, because the first pivot point, the second pivot point, the first connecting point, and the second connecting point are placed as described above, and/or because the third pivot point, the fourth pivot point, the third connecting point, and the fourth connecting point are placed as described above, the receive portion moves diagonally upward relative to the base portion. Accordingly, when a rear end collision occurs, the receive portion can appropriately contact with a back of a head of an occupant to receive entire head of the occupant leaning backward and carried upward. As a result, whiplash of the occupant can be inhibited.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest, comprising:
   a base portion attached to an upper part of a seat;
   a receive portion for receiving a head of an occupant sitting on the seat and movable between a first position adjacent to the base portion and a second position separate from the base portion;
   a first connecting portion for connecting the base portion with the receive portion and including a first link and a second link relatively rotatably supported to the first link;
   a drive input portion provided at least at either one of the first link and the second link; and
   a motor for driving the first connecting portion through the drive input portion to move the first connecting portion in a manner causing the receive portion to move from the second position to the first position, wherein
   a first end portion of the first link is supported by the base portion through a first pivot point,
   a second end portion of the first link is supported by the receive portion through a second pivot point,
   a first end portion of the second link is slidably connected to a first elongated guide portion provided at the base portion through a first connecting point so that the first connecting point is slidable along the first elongated guide portion,
   a second end portion of the second link is slidably connected to a second elongated guide portion provided at the receive portion through a second connecting point so that the second connecting point is slidable along the second elongated guide portion, and
   a driving force is applied to the drive input portion by the motor in a moving direction of the receive portion toward the second position upon either prediction or detection of a vehicular rear-end collision.

2. The headrest according to claim 1, further including a second connecting portion provided between the base portion and the receive portion for connecting the base portion with the receive portion and including a third link and a fourth link relatively rotatably supported to the third link, wherein
   a first end portion of the third link is supported by the base portion through a third pivot point, a second end portion of the third link is supported by the receive portion through a fourth pivot point, a first end portion of the fourth link is slidably connected to a third guide portion provided at the base portion through a third connecting point, and a second end portion of the fourth link is slidably connected to a fourth guide portion provided at the receive portion through a fourth connecting point.

3. The headrest according to claim 2, wherein
   at least either one of the first link and the second link has a support shaft, the first link of the first connecting portion, the second link of the first connecting portion, the third link of the second connecting portion, and the fourth link of the second connecting portion are supported by the support shaft at a first crossing portion of the first link of the first connecting portion with the second link of the first connecting portion and at a second crossing portion of the third link of the second connecting portion with the fourth link of the second connecting portion, and the drive input portion is provided at the support shaft.

4. The headrest according to claim 3, wherein
   the first link, the third link, and the support shaft are integrally formed.

5. The headrest according to claim 1, wherein
   the first pivot point is placed higher than the first connecting point, the second pivot point is placed lower than the second connecting point, and when the receive portion is at the first position, the second pivot point is placed lower than the first pivot point.

6. The headrest according to claim 3, wherein
   the second link, the fourth link, and the support shaft are integrally formed.

7. The headrest according to claim 2, wherein
   the third pivot point is placed higher than the third connecting point, the fourth pivot point is placed lower than the fourth connecting point, and when the receive portion is at the first position, the fourth pivot point is placed lower than the third pivot point.

8. The headrest according to claim 1, wherein the drive input portion passes through the first link and the second link.

9. The headrest according to claim 1, wherein said motor also moves the first connecting portion in a manner causing the receive portion to move from the first position to the second position.

10. A headrest, comprising:
    a base portion attached to an upper part of a seat;
    a receive portion for receiving a head of an occupant sitting on the seat and movable between a first position adjacent to the base portion and a second position separate from the base portion;
    a first connecting portion provided between the base portion and the receive portion for connecting the base portion with the receive portion and including a first link and a second link relatively rotatably supported to the first link by a support shaft; and a drive input portion provided at the support shaft, the drive input portion to which a driving force is applied from a motor upon either prediction or detection of a vehicular rear-end collision, and wherein the drive input portion passes through the first link and the second link;
    wherein a first end portion of the first link is supported by the base portion through a first pivot point, a second end portion of the first link is supported by the receive portion through a second pivot point, a first end portion of the second link is slidably connected to a first guide portion provided at the base portion through a first connecting point, and a second end portion of the second link is slidably connected to a second guide portion provided at the receive portion through a second connecting point.

11. The headrest according to claim 10, wherein
    the first pivot point is placed higher than the first connecting point, the second pivot point is placed lower than the second connecting point, and when the receive portion is at the first position, the second pivot point is placed lower than the first pivot point.

12. The headrest according to claim 10, wherein
    the motor is provided at the base portion.

13. A headrest, comprising:
    a base portion attached to an upper part of a seat;
    a receive portion for receiving a head of an occupant sitting on the seat and movable between a first position adjacent to the base portion and a second position separate from the base portion;
    a first connecting portion provided between the base portion and the receive portion for connecting the base portion with the receive portion; and a drive input portion provided at the first connecting portion, the drive input portion to which a driving force is applied from a motor, wherein the driving force is applied to the drive input portion by the motor in a moving direction of the receive portion toward the second position upon either prediction or detection of a vehicular rear-end collision, and the first connecting portion includes a first link and a second link relatively rotatably supported to the first link, a first end portion of the first link is supported by the base portion through a first pivot point, a second end portion of the first link is supported by the receive portion through a second pivot point, a first end portion of the second link is slidably connected to a first guide portion provided at the base portion through a first connecting point, and a second end portion of the second link is slidably connected to a second guide portion provided at the receive portion through a second connecting point.

14. The headrest according to claim 13, wherein
the first pivot point is placed higher than the first connecting point, the second pivot point is placed lower than the second connecting point, and when the receive portion is at the first position, the second pivot point is placed lower than the first pivot point.

15. The headrest according to claim 13, wherein
the motor is provided at the base portion.

* * * * *